(12) United States Patent
Avataneo et al.

(10) Patent No.: US 10,906,999 B2
(45) Date of Patent: Feb. 2, 2021

(54) FLUOROELASTOMER COMPOSITIONS

(71) Applicant: SOLVAY SPECIALTY POLYMERS ITALY S.P.A., Bollate (IT)

(72) Inventors: Marco Avataneo, Milan (IT); Liubov Chernysheva, Milan (IT); Ugo De Patto, Cogliate (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 1 day.

(21) Appl. No.: 16/061,943

(22) PCT Filed: Dec. 14, 2016

(86) PCT No.: PCT/EP2016/080954
§ 371 (c)(1),
(2) Date: Jun. 13, 2018

(87) PCT Pub. No.: WO2017/102818
PCT Pub. Date: Jun. 22, 2017

(65) Prior Publication Data
US 2018/0371134 A1 Dec. 27, 2018

(30) Foreign Application Priority Data
Dec. 14, 2015 (EP) .................................. 15199924

(51) Int. Cl.
| | | |
|---|---|---|
| C08F 214/22 | (2006.01) |
| C08L 27/12 | (2006.01) |
| C08L 71/02 | (2006.01) |
| C08F 214/18 | (2006.01) |
| C08F 214/26 | (2006.01) |
| C08K 3/22 | (2006.01) |
| C08K 5/14 | (2006.01) |
| C08K 5/17 | (2006.01) |
| C08K 5/30 | (2006.01) |
| C08K 5/33 | (2006.01) |
| C08K 5/57 | (2006.01) |
| C08L 27/16 | (2006.01) |
| C08L 27/18 | (2006.01) |

(52) U.S. Cl.
CPC ...... *C08F 214/222* (2013.01); *C08F 214/182* (2013.01); *C08F 214/26* (2013.01); *C08K 3/22* (2013.01); *C08K 5/14* (2013.01); *C08K 5/17* (2013.01); *C08K 5/30* (2013.01); *C08K 5/33* (2013.01); *C08K 5/57* (2013.01); *C08L 27/12* (2013.01); *C08L 71/02* (2013.01); *C08F 2800/10* (2013.01); *C08K 2003/2206* (2013.01); *C08L 27/16* (2013.01); *C08L 27/18* (2013.01)

(58) Field of Classification Search
CPC combination set(s) only.
See application file for complete search history.

(56) References Cited

U.S. PATENT DOCUMENTS

| | | |
|---|---|---|
| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,278,776 A | 7/1981 | Mauro et al. |
| 4,281,092 A | 7/1981 | Breazeale |
| 4,394,489 A | 7/1983 | Aufdermarsh |
| 4,564,662 A | 1/1986 | Albin |
| 4,694,045 A | 9/1987 | Moore |
| 4,745,165 A | 5/1988 | Arcella et al. |
| 4,943,622 A | 7/1990 | Naraki et al. |
| 5,173,553 A | 12/1992 | Albano et al. |
| 5,447,993 A | 9/1995 | Logothetis |
| 5,741,922 A * | 4/1998 | Yoshino .................. C07C 17/35 556/445 |
| 5,767,204 A | 6/1998 | Iwa et al. |
| 5,789,489 A | 8/1998 | Coughlin et al. |
| 5,789,509 A | 8/1998 | Schmiegel |

FOREIGN PATENT DOCUMENTS

| | | | |
|---|---|---|---|
| EP | 120462 A1 | 10/1984 |
| EP | 136596 A2 | 4/1985 |
| EP | 182299 A2 | 5/1986 |
| EP | 199138 A2 | 10/1986 |
| EP | 222408 A2 | 5/1987 |
| EP | 335705 A1 | 10/1989 |
| EP | 410351 A1 | 1/1991 |
| EP | 0661304 A1 | 7/1995 |
| EP | 684277 A1 | 11/1995 |
| EP | 0860436 A1 | 8/1998 |
| EP | 2100909 A1 * | 9/2009 | ........... C08G 65/007 |
| WO | 95/02634 A1 | 1/1995 |
| WO | 9705122 A1 | 2/1997 |
| WO | 2012007374 A1 | 1/2012 |
| WO | WO-2013087596 A1 * | 6/2013 |

* cited by examiner

*Primary Examiner* — Nicole M. Buie-Hatcher
(74) *Attorney, Agent, or Firm* — Osha Bergman Watanabe & Burton LLP

(57) ABSTRACT

The invention pertains to a (per)fluoroelastomer composition comprising: —a (per)fluoroelastomer [fluoroelastomer (A)]; and —at least one (per)fluoropolyether additive [polymer (E)] comprising a (per)fluoropolyether chain comprising recurring units having at least one catenary ether bond and at least one fluorocarbon moiety, and comprising at least one chain end comprising at least one per(halo)fluorinated aromatic group [group ($Ar^F$)], said polymer (E) being comprised in the composition in an amount of 0.5 to 30 phr, with respect to fluoroelastomer (A).

20 Claims, No Drawings

FLUOROELASTOMER COMPOSITIONS

CROSS-REFERENCE TO RELATED APPLICATION

This application is a U.S. national stage entry under 35 U.S.C. § 371 of International Application No. PCT/EP2016/080954 filed Dec. 14, 2016, which claims priority to European application No. 15199924.0 filed Dec. 14, 2015. The entire contents of these applications are explicitly incorporated herein by this reference.

TECHNICAL FIELD

The present invention relates to novel fluoroelastomer compositions, to a process for their production and their use, as well as a process for producing fluororubber mouldings therefrom.

BACKGROUND ART

Vulcanized (per)fluoroelastomers are materials with excellent heat-resistance and chemical-resistance characteristics, which are generally used in the manufacture of technical articles such as sealing parts, pipes, oil seals and O-rings in which the leaktightness, the mechanical properties and the resistance to substances such as mineral oils, hydraulic fluids, solvents or chemical agents of diverse nature must be ensured over a wide range of working temperatures, from high to very low temperatures.

Low temperature flexibility refers to the temperature, at or below which an elastomer vulcanizate changes from an elastomeric, to a stiff, glassy state, at which point the vulcanizate is no longer flexible, and does not exhibit the ability to recover after being deformed.

Fluoroelastomers in general have low temperature properties dictated by two factors: the size of the fluorine atom and the substituent fluorocarbon molecules (e.g. trifluoro and trifluoroalkoxy groups) and the various intermolecular molecular forces that come into play due to fluorine's high electronegativity.

The presence of a bulky branch group (methyl, trifluoromethyl or perfluoroalkoxy) causes the polymerization to create the "random walk" chain configuration that is necessary for a "rubbery" elastomer. Several tests are useful for determining the lowest temperature at which fluoroelastomers retain their elastomeric properties, including Temperature of Retraction (TR-10), Glass Transition Temperature (Tg), and the like.

Dynamic seal applications with fluoroelastomer-based products may require parts to maintain elastomeric behavior at temperatures as low as −40° C., and in some cases, even lower temperatures.µ

Within this frame, efforts have been devoted in the past to the modification of the fluoroelastomer polymer chain structure, e.g. via incorporation of specific monomers having bulkier pendant side chains and/or to the provision of curable formulation possessing appropriate additives for extending elastomeric domain.

On the other side, perfluoropolyethers have been suggested as processing aids, due to their miscibility with the fluoroelastomeric matrix. EP 0222408 A (AUSIMONT SPA) 20, May 1987 discloses vulcanizable compositions of fluoroelastomers based on vinylidene fluoride, comprising a fluoropolyether as processing aid; similarly, U.S. Pat. No. 4,278,776 (MONTEDISON SPA) 14, Jul. 1981 discloses the use of perfluoropolyethers processing aids in VDF-based fluoroelastomers; in particular performances obtained with perfluoropolyether greases consisting of mixtures of an oil and PTFE particles were compared to those of a perfluoropolyether polyamide in curable fluoroelastomer compounds. In all these documents, adjunction of the perfluoropolyether processing adjuvant was found to be accompanied by a significant reduction of hardness and mechanical properties (modulus). Also, these materials, due to their inherent volatility, undergo migration phenomena and could exude from the cured parts in high temperature operating conditions, so that failures occur and performances of said parts are significantly affected.

There is thus still a continuous quest in the art for fluoroelastomer compositions that can deliver cured parts having low temperature elastomeric behaviour, and hence extending continuous use domain down to −40° C. or beyond, while still maintaining all advantageous performances (mechanical properties, sealing properties).

The object of the present invention is therefore to provide fluoroelastomers that advantageously exhibit this property profile.

SUMMARY OF INVENTION

The invention thus provides for a fluoroelastomer composition possessing improved low temperature elastomer properties, and more specifically, the invention pertains to a (per)fluoroelastomer composition [composition (C)] comprising:

a (per)fluoroelastomer [fluoroelastomer (A)]; and at least one (per)fluoropolyether additive [polymer (E)] comprising a (per)fluoropolyether chain comprising recurring units having at least one catenary ether bond and at least one fluorocarbon moiety, and comprising at least one chain end comprising at least one per(halo) fluorinated aromatic group [group $(Ar^F)$], said polymer (E) being comprised in the composition in an amount of 0.5 to 30 phr, with respect to fluoroelastomer (A).

The Applicant has surprisingly found that the incorporation of polymer (E) in the (per)fluoroelastomer composition, as above detailed, is effective and homogeneous, in the sense that polymer (E) is not migrating out of the final parts made therefrom (no oil tracks on the surface of molded, treated slabs and o-ring), and enables achieving significant decrease in glass transition temperature, while delivering outstanding sealing performances (C-set, notably).

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable (per)fluorinated monomers are notably:

- $C_2$-$C_8$, fluoro- and/or perfluoroolefins, such as tetrafluoroethylene (TFE), hexafluoropropene (HFP), pentafluoropropylene, and hexafluoroisobutylene;
- $C_2$-$C_8$, hydrogenated monofluoroolefins, such as vinyl fluoride; 1,2-difluoroethylene, vinylidene fluoride (VDF) and trifluoroethylene (TrFE);
- (per)fluoroalkylethylenes complying with formula $CH_2$=$CH$—$R_{f0}$, in which $R_{f0}$ is a $C_1$-$C_6$ (per)fluoroalkyl or a $C_1$-$C_6$ (per)fluorooxyalkyl having one or more ether groups;
- chloro- and/or bromo- and/or iodo-$C_2$-$C_6$ fluoroolefins, like chlorotrifluoroethylene (CTFE);
- fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_5$, —$C_3F_7$;
- hydrofluoroalkylvinylethers complying with formula $CH_2$=$CFOR_{f1}$ in which $R_{f1}$ is a $C_1$-$C_6$ fluoro- or perfluoroalkyl, e.g. —$CF_3$, —$C_2F_5$, —$C_3F_7$;
- fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups; in particular (per)fluoro-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;
- functional fluoro-alkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;
- (per)fluorodioxoles, of formula:

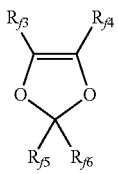

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:

(1) VDF-based copolymers, in which VDF is copolymerized with at least one comonomer selected from the group consisting of:

(a) $C_2$-$C_8$ perfluoroolefins, such as tetrafluoroethylene (TFE), hexafluoropropylene (HFP);

(b) hydrogen-containing $C_2$-$C_8$ olefins, such as vinyl fluoride (VF), trifluoroethylene (TrFE), hexafluoroisobutene (HFIB), perfluoroalkyl ethylenes of formula $CH_2$=$CH$—$R_f$, wherein $R_f$ is a $C_1$-$C_6$ perfluoroalkyl group;

(c) $C_2$-$C_8$ fluoroolefins comprising at least one of iodine, chlorine and bromine, such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, preferably $CF_3$, $C_2F_5$, $C_3F_7$;

(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

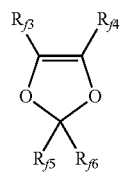

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula:

wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom; $R_{f2}$ is —$CF_2CF_3$ (MOVE1); —$CF_2CF_2OCF_3$ (MOVE2); or —$CF_3$ (MOVE3);

(h) $C_2$-$C_8$ non-fluorinated olefins (Ol), for example ethylene and propylene;

(i) ethylenically unsaturated compounds comprising nitrile (—CN) groups, possibly (per)fluorinated; and (2) TFE-based copolymers, in which TFE is copolymerized with at least one comonomer selected from the group consisting of (c), (d), (e), (g), (h) and (i) as above detailed.

Optionally, fluoroelastomer (A) of the present invention also comprises recurring units derived from a bis-olefin [bis-olefin (OF)] having general formula:

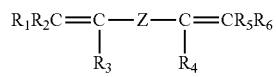

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ hydrocarbon radical (including alkylene or cycloalkylene radical), optionally containing oxygen atoms, preferably at least partially fluorinated, or a (per)fluoropolyoxyalkylene radical, e.g. as described in EP 661304 A (AUSIMONT SPA) 5, Jul. 1995.

The bis-olefin (OF) is preferably selected from the group consisting of those complying with formulae (OF-1), (OF-2) and (OF-3):

(OF-1)

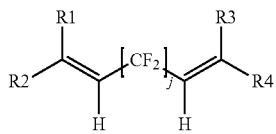

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

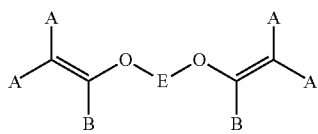

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a $(CF_2)_m$— group, with m being an integer from 3 to 5; a preferred bis-olefin of (OF-2) type is $F_2C=CF-O-(CF_2)_5-O-CF=CF_2$.

(OF-3)

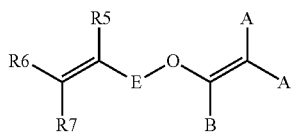

wherein E, A and B have the same meaning as above defined; R5, R6, R7, equal or different from each other, are H, F or $C_{1-5}$ alkyl or (per)fluoroalkyl group.

Exemplary fluoroelastomers (A) which can be used in the composition of the present invention are those having following monomers composition (in mol %, with respect to the total moles of recurring units):

(i) vinylidene fluoride (VDF) 35-85%, hexafluoropropene (HFP) 10-45%, tetrafluoroethylene (TFE) 0-30%, (per)fluoroalkylvinylethers (PAVE) 0-15%; bis-olefin (OF): 0-5%;
(ii) vinylidene fluoride (VDF) 50-80%, (per)fluoroalkyl-vinylethers (PAVE) 5-50%, tetrafluoroethylene (TFE) 0-20%, bis-olefin (OF): 0-5%;
(iii) vinylidene fluoride (VDF) 20-30%, $C_2$-$C_8$ non-fluorinated olefins (Ol) 10-30%, hexafluoropropene (HFP) and/or (per)fluoroalkylvinylethers (PAVE) 18-27%, tetrafluoroethylene (TFE) 10-30%; bis-olefin (OF): 0-5%;
(iv) tetrafluoroethylene (TFE) 50-80%, (per)fluoroalkyl-vinylethers (PAVE) 15-50%; bis-olefin (OF): 0-5%;
(v) tetrafluoroethylene (TFE) 45-65%, $C_2$-$C_8$ non-fluorinated olefins (Ol) 20-55%, vinylidene fluoride 0-30%; bis-olefin (OF): 0-5%;
(vi) tetrafluoroethylene (TFE) 32-60% mol %, $C_2$-$C_8$ non-fluorinated olefins (Ol) 10-40%, (per)fluoroalkyl-vinylethers (PAVE) 20-40%, fluorovinyl ethers (MOVE) 0-30%; bis-olefin (OF): 0-5%;
(vii) tetrafluoroethylene (TFE) 33-75%, (per)fluoroalkyl-vinylethers (PAVE) 15-45%, vinylidene fluoride (VDF) 5-30%, hexafluoropropene HFP 0-30%; bis-olefin (OF): 0-5%;
(viii) vinylidene fluoride (VDF) 35-85%, (per)fluoro-methoxy-vinylethers (MOVE) 5-40%, (per)fluoroal-kylvinylethers (PAVE) 0-30%, tetrafluoroethylene (TFE) 0-40%, hexafluoropropene (HFP) 0-30%; bis-olefin (OF): 0-5%;
(ix) tetrafluoroethylene (TFE) 20-70%, (per)fluoro-methoxy-vinylethers (MOVE) 25-75%, (per)fluoroal-kylvinylethers (PAVE) 0-50%, bis-olefin (OF): 0-5%.

The fluoroelastomer (A) can be prepared by any known method, such as emulsion or micro-emulsion polymerization, suspension or micro-suspension polymerization, bulk polymerization and solution polymerization.

According to certain embodiments of the invention, the fluoroelastomer (A) may comprise cure sites; the selection of cure sites is not particularly critical, provided that they ensure adequate reactive in curing.

The fluoroelastomer (A) can comprise said cure sites either as pendant groups bonded to certain recurring units or as end groups of the polymer chain.

Among cure-site containing recurring units, mention can be notably made of:

(CSM-1) iodine or bromine containing monomers of formula:

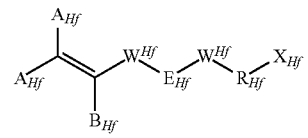

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a $(CF_2)_m$— group, with m being an integer from 3 to 5;

(CSM-2) ethylenically unsaturated compounds comprising nitrile (—CN) groups, possibly (per)fluorinated.

Among cure-site containing monomers of type (CSM1), preferred monomers are those selected from the group consisting of: (CSM1-A) iodine-containing perfluorovinylethers of formula:

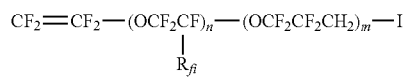

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17, May 1988, U.S. Pat. No. 4,564,662 (MINNESOTA MINING & MFG [US]) 14, Jan. 1986 and EP 199138 A (DAIKIN IND LTD) 29, Oct. 1986); and (CSM-1B) iodine-containing ethylenically unsaturated compounds of formula:

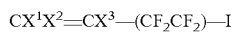

$CX^1X^2=CX^3-(CF_2CF_2)-I$ wherein each of $X^1$, $X^2$ and $X^3$, equal to or different from each other, are independently H or F; and p is an integer from 1 to 5; among these compounds, mention can be made of $CH_2=CHCF_2CF_2I$, $I(CF_2CF_2)_2CH=CH_2$, $ICF_2CF_2CF=CH_2$, $I(CF_2CF_2)_2CF=CH_2$;

(CSM-1C) iodine-containing ethylenically unsaturated compounds of formula:

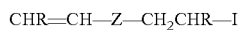

$CHR=CH-Z-CH_2CHR-I$ wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2=CH-(CF_2)_4CH_2CH_2I$, $CH_2=CH-(CF_2)_6CH_2CH_2I$, $CH_2=CH-(CF_2)_8CH_2CH_2I$, $CH_2=CH-(CF_2)_2CH_2CH_2I$; (CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) 12, Jul. 1977 or other compounds bromo and/or iodo alpha-olefins disclosed in U.S. Pat. No. 4,694,045 (DU PONT) 15, Sep. 1987.

Among cure-site containing monomers of type (CSM2), preferred monomers are (per)fluorinated and are especially those selected from the group consisting of:

(CSM2-A) perfluorovinyl ethers containing nitrile groups of formula $CF_2=CF-(OCF_2CFX^{CN})_m-O-(CF_2)_n-CN$, with $X^{CN}$ being F or $CF_3$, m being 0, 1, 2, 3 or 4; n being an integer from 1 to 12;

(CSM2-B) perfluorovinyl ethers containing nitrile groups of formula $CF_2=CF-(OCF_2CFX^{CN})_{m'}-O-CF_2CF(CF_3)-ON$, with $X^{CN}$ being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DU PONT) 28, Jul. 1981, U.S. Pat. No. 4,281,092 (DU PONT) 28, Jul. 1981, U.S. Pat. No. 5,447,993 (DU PONT) 5, Sep. 1995 and U.S. Pat. No. 5,789,489 (DU PONT) 4, Aug. 1998.

When fluoroelastomer (A) is intended for peroxide curing, fluoroelastomer (A) of the invention preferably comprises iodine and/or bromine cure sites in an amount of 0.001 to 10% wt. Among these, iodine cure sites are those selected for maximizing curing rate.

According to this embodiment, for ensuring acceptable reactivity it is generally understood that the content of iodine and/or bromine in the fluoroelastomer (A) should be of at least 0.05% wt, preferably of at least 0.1% weight, more preferably of at least 0.15% weight, with respect to the total weight of fluoroelastomer (A).

On the other side, amounts of iodine and/or bromine not exceeding preferably 7% wt, more specifically not exceeding 5% wt, or even not exceeding 4% wt, with respect to the total weight of fluoroelastomer (A), are those generally selected for avoiding side reactions and/or detrimental effects on thermal stability.

These iodine or bromine cure sites of these preferred embodiments of the invention might be comprised as pending groups bound to the backbone of the fluoroelastomer (A) polymer chain or might be comprised as terminal groups of said polymer chain.

According to a first embodiment, the iodine and/or bromine cure sites are comprised as pending groups bound to the backbone of the fluoroelastomer polymer chain; the fluoroelastomer (A) according to this embodiment typically comprises recurring units derived from brominated and/or iodinated cure-site comonomers selected from:

bromo and/or iodo alpha-olefins containing from 2 to 10 carbon atoms such as bromotrifluoroethylene or bromotetrafluorobutene described, for example, in U.S. Pat. No. 4,035,565 (DU PONT) 12, Jul. 1977 or other compounds bromo and/or iodo alpha-olefins disclosed in U.S. Pat. No. 4,694,045 (DU PONT) 15, Sep. 1987;

iodo and/or bromo fluoroalkyl vinyl ethers (as notably described in U.S. Pat. No. 4,745,165 (AUSIMONT SPA) 17, May 1988, U.S. Pat. No. 4,564,662 (MINNESOTA MINING & MFG [US]) 14, Jan. 1986 and EP 199138 A (DAIKIN IND LTD) 29, Oct. 1986).

The fluoroelastomer according to this embodiment generally comprises recurring units derived from brominated and/or iodinated cure-site monomers in amounts of 0.05 to 5 mol per 100 mol of all other recurring units of the fluoroelastomer, so as to advantageously ensure above mentioned iodine and/or bromine weight content.

According to a second preferred embodiment, the iodine and/or bromine cure sites (preferably iodine cure sites) are comprised as terminal groups of the fluoroelastomer (A) polymer chain; the fluoroelastomer according to this embodiment is generally obtained by addition to the polymerization medium during fluoroelastomer manufacture of anyone of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with 1 x+y 2 (see, for example, U.S. Pat. No. 4,243,770 (DAIKIN IND LTD) 6, Jan. 1981 and U.S. Pat. No. 4,943,622 (NIPPON MEKTRON KK) 24, Jul. 1990); and alkali metal or alkaline-earth metal iodides and/or bromides, such as described notably in U.S. Pat. No. 5,173,553 (AUSIMONT SRL) 22, Dec. 1992.

When aiming at obtaining materials having lower glass transition temperatures, among above referred fluoroelastomers (A), VDF-based copolymers are preferred and provide for increased crosslinking density, thus improved mechanical properties, while reducing the cost.

Among VDF-based copolymers, polymers comprising (with respect to total moles of recurring units of fluoroelastomer (A)):

from 5 to 35% moles, preferably from 7 to 30% moles, more preferably from 15 to 25% moles of recurring units derived from at least one (per)fluoro-methoxy-vinylethers (MOVE), as above detailed;

from 0.5 to 35% moles, preferably from 1 to 30% moles, more preferably from 2 to 25% moles of recurring units derived from at least one $C_2$-$C_8$ perfluoroolefin, typically selected from tetrafluoroethylene (TFE), hexafluoropropylene (HFP), hexafluoroisobutylene, preferably from TFE;

with the provisio that the sum of recurring units derived from (per)fluoro-methoxy-vinylethers (MOVE) and from the perfluoroolefin is of at least 10% moles, preferably at least 15% moles, more preferably at least 17% moles;

from 0 to 5% moles, preferably from 0 to 3% moles, more preferably from 0 to 2.5% moles of recurring units derived from a bis-olefin (OF), as above detailed; and from 90 to 30% moles, preferably from 85 to 40% moles, more preferably from 83 to 50% moles of recurring units derived from VDF.

Preferably, the VDF-based polymers, as above detailed, are intended for peroxide curing; to this aim, they generally comprise iodine cure sites as terminal groups of the fluoroelastomer (A) polymer chain, as above detailed, generally in the amounts mentioned above.

The (per)fluoropolyoxyalkylene chain [chain ($R_f$)] of polymer (E) is preferably a chain comprising a plurality of recurring units ($R_1$), said recurring units having general formula: $-(CF_2)_k-CFZ-O-$, wherein k is an integer of from 0 to 3 and Z is selected between a fluorine atom and a $C_1$-$C_6$ perfluoro(oxy)alkyl group.

Chain ($R_f$) of the polymer (E) more preferably complies with formula:

$$-(CF_2CF_2O)_{a'}(CFYO)_{b'}(CF_2CFYO)_{c'}(CF_2O)_{d'}(CF_2(CF_2)_zCF_2O)_{e'}-,$$

wherein the recurring units are statistically distributed along the (per)fluoropolyoxyalkylene chain, wherein:

Y is a $C_1$-$C_5$ perfluoro(oxy)alkyl group;

z is 1 or 2;

a', b', c', d', e' are integers≥0.

Most preferably, chain $R_f$ complies with formula:

$$-(CF_2CF_2O)_{a''}(CF_2O)_{b''}(CF_2(CF_2)_zCF_2O)_{c''}-,$$

wherein:

z is 1 or 2;

a", b", c" are integers≥0.

Chain $R_f$ is generally selected so as to possess a number averaged molecular weight of 500 to 5000, preferably of 750 to 3000, even more preferably of 1000 to 2000.

The choice of the per(halo)fluorinated aromatic group [group ($Ar^F$)], comprised in polymer (E), is not particularly limited, provided that this compound is aromatic and that is per(halo)fluorinated, that is to say that it is free from hydrogen atoms and comprises at least one fluorine atoms.

For the avoidance of doubt, the term "aromatic group" is hereby intended to denote a cyclic substituent having a delocalized conjugated π system with a number of π delocalized electrons fulfilling the Hückel's rule (number of π electrons equal to (4n+2), with n being an integer).

The group ($Ar^F$) can be monocyclic or polycyclic. It can comprise one or more than one aromatic ring. Should it comprise more than one aromatic ring, these aromatic rings can be condensed or not condensed. The group ($Ar^F$) can be a heteroaromatic compound, comprising one or more heteroatoms (e.g. O, S, N) in the ring. It can be substituted or not substituted.

Preferably the group ($Ar^F$) is perfluorinated, that is to say that all its free valences are saturated with fluorine atoms. Non limitative examples of group ($Ar^F$) which are suitable to the purposes of the invention are notably perfluorobenzene group, perfluorobiphenyl groups, perfluoronaphthalene groups, perfluoroanthracene groups, perfluoropyridine groups, perfluorotoluene groups and derivatives thereof comprising one or more perfluorinated substituent(s).

Generally, polymer (E) complies with formula:

$$T-O-R_f-T' \qquad (I)$$

wherein:

$R_f$ is a chain $R_f$ as above detailed;

each of T and T', equal to or different from each other, are selected from:

a group of any of formulae $-CF_3$, $-CF_2Cl$, $-CFZ*CH_2OH$, $-CFZ*COOH$, $-CFZ*COOR_h$, and $CFZ*-CH_2(OCH_2CH_2)_k-OH$, wherein k is an integer comprised ranging from 0 to 10, wherein $Z*$ is F or $CF_3$; $R_h$ is a hydrocarbon chain; and a group ($Ar^{F'}$) of formula $-CFZ-CH_2(OCH_2CH_2)_k-O-Ar^F$, wherein k' is an integer ranging from 0 to 10, wherein $Z$ is F or $CF_3$; $Ar^F$ is a perfluoroaromatic group; and $Ar^F$ is preferably a perfluorobenzene group of formula $-C_6F_5$;

with the provisio that at least one of T and T' is a group ($Ar^{F'}$), as above detailed.

Polymer (E) preferably complies with formula:

$$T*-O-(CF_2CF_2O)_{a'}(CFYO)_{b'}(CF_2CFYO)_{c'}(CF_2O)_{d'}(CF_2(CF_2)_zCF_2O)_{e'}-T*',$$

wherein:

Y is a $C_1$-$C_5$ perfluoro(oxy)alkyl group;

z is 1 or 2;

a', b', c', d', e' are integers≥0;

each of $T*$ and $T*'$, equal to or different from each other, are selected from:

a group of any of formulae $-CF_3$, $-CF_2Cl$, $-CFZ*CH_2OH$, $-CFZ*COOH$, $-CFZ*COOR_h$, and $-CFZ*-CH_2(OCH_2CH_2)_k-OH$, wherein k is an integer comprised ranging from 0 to 10, wherein $Z*$ is F or $CF_3$; $R_h$ is a hydrocarbon chain; and a group ($Ar^{F'}$) of formula $-CFZ**-CH_2(OCH_2CH_2)_k-O-Ar^F$, wherein k' is an integer ranging from 0 to 10, wherein $Z*$ is F or $CF_3$; $Ar^F$ is a perfluoroaromatic group; and $Ar^F$ is preferably a perfluorobenzene group of formula $-C_6F_5$;

with the provisio that at least one of T and T' is a group ($Ar^{F'}$), as above detailed.

As said, polymer (E) is comprised in the composition in an amount of 0.5 to 30 phr, with respect to fluoroelastomer (A). More specifically, polymer (E) is present in composition (C) in an amount of at least 3 phr, preferably at least 5 phr, more preferably at least 7 phr, and/or in an amount of preferably at most 25 phr, more preferably at most 22 phr. Amounts of polymer (E) which have been found particularly satisfactory are amounts of about 10 phr to about 20 phr.

The invention also pertains to the use of the (per)fluoroelastomer composition as above described for fabricating shaped articles.

The composition (C) can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomeric uncured composition into a finished article made of non-tacky, strong, insoluble, chemically and thermally resistant cured fluoroelastomer material.

The composition (C) of the invention can be advantageously cured by peroxide curing technique, by ionic technique, by tin-catalyzed curing or by a mixed peroxidic/ionic technique.

The peroxide curing is typically performed according to known techniques via incorporation into the (per)fluoroelastomer composition of at least one suitable peroxide that is capable of generating radicals by thermal decomposition. Organic peroxides are generally employed.

Still an object of the invention is thus a composition comprising fluoroelastomer (A) and polymer (E), as above detailed; and at least one peroxide, typically an organic peroxide. This composition is advantageously peroxide curable.

Among most commonly used peroxides, mention can be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl] carbonate. Other suitable peroxide systems are those described, notably, in patent applications EP 136596 A (MONTEDISON SPA) 10, Apr. 1985 and EP 410351 A (AUSIMONT SRL) 30, Jan. 1991, whose content is hereby incorporated by reference.

Other ingredients generally comprised in the peroxide curable composition, as above detailed, are selected from the group consisting of:

(a) polyunsaturated curing coagents, in amounts generally of from 0.5 to 10 phr, and preferably of from 1 to 7 phr, relative to 100 weight parts of fluoroelastomer (A); among these agents, the following are commonly used: triallyl cyanurate; triallyl isocyanurate (TAIC); tris(diallylamine)-s-triazine; triallyl phosphite; N,N-diallylacrylamide; N,N, N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) 26, Aug. 1998 and WO 97/05122 (DU PONT [US]) 13, Feb. 1997; among above mentioned curing coagents, TAIC and bis-olefins (OF), as above detailed, and more specifically TAIC and bis-olefins of formula (OF-1), as above detailed, have been found to provide particularly good results;

(b) optionally, metallic basic compounds, in amounts generally of from 0.5 to 15 phr, and preferably of from 1 to 10 phr, relative to 100 weight parts of fluoroelastomer (A); metallic basic compounds are generally selected from the group consisting of (j) oxides or hydroxides of divalent metals, for instance oxides or hydroxides of Mg, Zn, Ca or Pb, and (jj) metal salts of a weak acid, for instance Ba, Na, K, Pb, Ca stearates, benzoates, carbonates, oxalates or phosphites;

(c) optionally, acid acceptors which are not metallic basic compounds, in amounts generally of from 0.5 to 15 phr, and preferably of from 1 to 10 phr, relative to 100 weight parts of fluoroelastomer (A); these acid acceptors are generally selected from nitrogen-containing organic compounds, such as 1,8-bis(dimethylamino)naphthalene, octadecylamine, etc., as notably described in EP 708797 A (DU PONT) 1, May 1996;

(d) optionally, other conventional additives, such as fillers, thickeners, pigments, antioxidants, stabilizers, processing aids, and the like.

Ionic curing can be achieved by incorporation into the (per)fluoroelastomer composition one or more than one curing agent and one or more than one accelerator suitable for ionic curing, as well known in the art.

Still an object of the invention is thus a composition comprising fluoroelastomer (A) and polymer (E), as above detailed; and at least one curing agent and at least one accelerator, and/or a combination thereof. This composition is advantageously ionically curable.

The amount of accelerator(s) is generally comprised between 0.05 and 5 phr, relative to 100 weight parts of fluoroelastomer (A); and the amount of the curing agent is typically between 0.5 and 15 phr and preferably between 1 and 6 phr, relative to 100 weight parts of fluoroelastomer (A).

Curing agents are generally selected from the group consisting of aromatic or aliphatic polyhydroxylated compounds, and derivatives thereof; examples thereof are described, notably, in EP 335705 A (MINNESOTA MINING & MFG [US]+) 4, Oct. 1989 and U.S. Pat. No. 4,233,427 (RHONE POULENC IND) 11, Nov. 1980. Among curing agents, mention will be made in particular of (i) dihydroxy, trihydroxy and tetrahydroxy benzenes, naphthalenes or anthracenes; (ii) bisphenol derivatives, in which the two aromatic rings are linked together via an aliphatic, cycloaliphatic or aromatic divalent radical, or alternatively via a divalent group inclusion one or more heteroatoms selected from the group consisting of O, S, and N, e.g. through an oxygen or sulphur atom, or via a carbonyl group. The aromatic rings may be substituted with one or more chlorine, fluorine or bromine atoms, or with carbonyl, alkyl or acyl groups. Bisphenol AF is particularly preferred.

Accelerators that may be used include:

(1) quaternary ammonium or phosphonium salts (see, e.g., EP 335705 A (MINNESOTA MINING & MFG [US]+) 4, Oct. 1989 and U.S. Pat. No. 3,876,654 (DU PONT) 8, Apr. 1975);

(2) aminophosphonium salts (see, e.g., U.S. Pat. No. 4,259,463 (MONTEDISON SPA) 31, Mar. 1981);

(3) phosphoranes (see, e.g., U.S. Pat. No. 3,752,787 (DU PONT) 14, Aug. 1973);

(4) imine compounds of formula $[Ar_3P=N=PAr_3]^{+n}X^{n-}$, with Ar being an aryl group, n=1 or 2 and X being a n-valent anion, e.g. as described in EP 0120462 A (MONTEDISON SPA) 3, Oct. 1984 or of formula $[(R_3P)_2N]^+X^-$, with R being an aryl or an alkyl group, and X being a monovalent anion, e.g. as described in EP 0182299 A (ASAHI CHEMICAL IND) 28, May 1986. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethylphosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) 29, Nov. 1995, which is included herein in its entirety by reference.

Other ingredients generally added to the ionically curable composition comprising fluoroelastomer (A) and polymer (E), as above detailed, In addition to the curing agent and accelerator (or combination thereof), are: i) one or more mineral acid acceptors selected from the group consisting of divalent metal oxides, e.g. MgO, CaO, ZnO, and the like, typically comprised in amounts of 1-40 parts per 100 parts of fluoroelastomer (A); ii) one or more basic compounds selected from the group constituted by Ca(OH)$_2$, Sr(OH)$_2$, Ba(OH)$_2$, metal salts of weak acids, for instance Ca, Sr, Ba, Na and K carbonates, benzoates, oxalates and phosphites and mixtures of the abovementioned hydroxides with the above mentioned metal salts; typically added in amounts of from 0.5 to 10 parts per 100 parts of fluoroelastomer (A).

Also, other conventional additives, such as fillers, thickeners, pigments, antioxidants, stabilizers and the like, may then be added to the curing mixture.

Mixed peroxidic/ionic curing can be achieved by simultaneously introducing in the composition of the invention one or more peroxide, as above detailed, and one or more curing agent and one or more accelerator suitable for ionic curing, as well known in the art. So still an object of the invention is a composition comprising fluoroelastomer (A), polymer (E), as above detailed, (i) at least one peroxide, and (ii) at least one curing agent and at least one accelerator, and/or a combination thereof.

When the fluoroelastomer (A) comprises recurring units derived from ethylenically unsaturated compounds comprising nitrile groups, possibly (per)fluorinated (e.g. monomers of type (CSM-2) as above detailed), curing can be further effected using at least one of (i) organotin compounds; (ii) aromatic amine compounds, including aromatic tetraamines, bis(aminophenols) and bis(aminothiophenols); (iii) bisamidrazones; (iv) bisamidoximes.

Specific examples of organotin compounds are notably described in U.S. Pat. No. 4,394,489 (DU PONT) 19, Jul. 1983 which discloses allyl-, propargyl- and allenyl-tin curatives; U.S. Pat. No. 5,767,204 (NIPPON MEKTRON KK) 16, Jun. 1998 provides for bis(aminophenyl) compounds represented by formula:

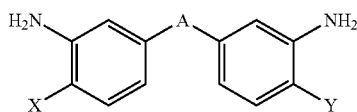

wherein A is an alkylidene group having 1 to 6 carbon atoms or a perfluoroalkylidene group having 1 to 10 carbon atoms and X and Y are a hydroxyl group or an amino group; U.S. Pat. No. 5,789,509 (DU PONT) 4, Aug. 1998 discloses tetraalkyltin, tetraaryltin compounds, bis(aminophenols) and bis(aminothiophenols) suitable for being used in the inventive composition.

The composition (C) of the invention can hence comprise, in addition to a fluoroelastomer (A) comprising recurring units derived from at least one ethylenically unsaturated compounds comprising a nitrile (—CN) group, as above detailed, and polymer (E), as above detailed; one or more than one of (i) organotin compounds; (ii) aromatic amine compounds, including aromatic tetraamines, bis(aminophenols) and bis(aminothiophenols); (iii) bisamidrazones; (iv) bisamidoximes, as above detailed.

This type of vulcanization may be combined with a vulcanization of peroxide type, in the case where the omposition (C) comprises a fluoroelastomer (A) comprising recurring units derived from at least one ethylenically unsaturated compounds comprising a nitrile (—CN) group which further contains iodinated and/or brominated end groups, as described notably in U.S. Pat. No. 5,447,993 (DU PONT) 5, Sep. 1995. The composition in this case may further comprise at least one peroxide, as above detailed, and, optionally, at least one polyunsaturated curing coagent, as above detailed.

Yet, the invention pertains to cured articles obtained from the composition (C), as above detailed. Said cured articles are generally obtained by moulding and curing the fluoroelastomer composition, as above detailed. these cured parts may be sealing articles, including O(square)-rings, packings, gaskets, diaphragms, shaft seals, valve stem seals, piston rings, crankshaft seals, cam shaft seals, and oil seals or maybe piping and tubings, in particular flexible hoses or other items, including conduits for delivery of hydrocarbon fluids and fuels.

Cured articles obtained from the composition (C), thanks to their ability to provide very low glass transition temperatures, are suitable for being used in fields of endeavours wherein low service temperatures are encountered, e.g. in particular as aerospace sealing parts, as elastomeric parts for automotive applications, including e.g. CNG and LPG systems, as well as parts for gas and/or oil drilling in cold environments (including e.g. off-shore operations).

Further in addition, the invention pertains to a method for processing the composition (C), as above detailed, according any of injection moulding, compression moulding, extrusion moulding, coating, screen printing technique, form-in-place technique.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

TECNOFLON® VPL X75545 FKM is a peroxide-curable iodine end group-containing fluoroelastomer, comprising recurring units derived from vinylidene fluoride (VDF) 60.5% by moles; tetrafluoroethylene (TFE) 17.5% by moles; and perfluoro-methoxy-vinylethers having formula $CF_2$=CF—OCF$_2$O—CF$_3$ (MOVES) 22% by moles(FKM-1), commercially available from Solvay Specialty Polymers Italy S.p.A.

Preparative Example 1: Preparation of a Hexafluorobenzene Derivative of PFPE Diol [PFPE-Ar$^F$-1]

A PFPE diol precursor [PFPE-1] having the following structure: HOCH$_2$CF$_2$O—(CF$_2$O)$_e$(CF$_2$CF$_2$O)$_m$(CF$_2$CF$_2$CF$_2$O)$_e$(CF$_2$CF$_2$CF$_2$CF$_2$O)$_q$—CF$_2$CH$_2$OH
wherein n=4.90, m=4.75, and (p+q)=0; the number average molecular weight (M$_n$) of the (per)fluoropolyether chain is equal to 1060 Dalton was used.

100 g of the PFPE-1 were mixed with 70 g of hexafluorobenzene (from Sigma-Aldrich) and 16 g of KOH powder (title 85%) were added to the liquid mixture at room temperature. The reaction mass was kept, under stirring, at 60° C. for 6 hours. The resulting solution was washed two times with aqueous HCl (0.1N) and dried at reduced pressure resulting 125.7 g of colourless liquid product. The $^{19}$F NMR analysis showed a total conversion (>99% by mol) of the CF$_2$CH$_2$OH groups to the correspondent aromatic derivative —CF$_2$CH$_2$OC$_6$F$_5$.

Preparative Example 2: Preparation of a Hexafluorobenzene Derivative of PFPE Diol [PFPE-Ar$^F$-2]

A PFPE diol precursor [PFPE-2] having the following structure: HOCH$_2$CF$_2$O—(CF$_2$O)$_n$(CF$_2$CF$_2$O)$_m$(CF$_2$CF$_2$CF$_2$O)$_p$(CF$_2$CF$_2$CF$_2$CF$_2$O)$_q$—CF$_2$CH$_2$OH wherein n=6.27, m=8.03, and (p+q)=0.09; the number average molecular weight (M$_n$) of the (per)fluoropolyether chain is equal to 1540 Dalton, was used.

100 g of the PFPE-2 were mixed with 50 g of hexafluorobenzene (from Sigma-Aldrich) and 11 g of KOH powder (title 85%) was added to the liquid mixture at room temperature.

The reaction mass was kept, under stirring, at 60° C. for 6 hours.

The resulting solution was washed two times with aqueous HCl (0.1N) and dried at reduced pressure resulting 118.4 g of colourless liquid product. The $^{19}$F NMR analysis showed a total conversion (>99% by mol) of the CF$_2$CH$_2$OH groups to the correspondent aromatic derivative —CF$_2$CH$_2$OC$_6$F$_5$.

Preparative Example 3: Preparation of Hexafluorobenzene Derivative of PFPE [PFPE-Ar$^F$-3]

A PFPE diol precursor [PFPE-2] having the following structure:

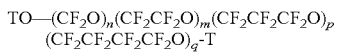
TO—(CF$_2$O)$_n$(CF$_2$CF$_2$O)$_m$(CF$_2$CF$_2$CF$_2$O)$_p$(CF$_2$CF$_2$CF$_2$CF$_2$O)$_q$-T T and T' are end groups —CF$_2$CH$_2$(OCH$_2$CH$_2$)$_k$—OH wherein n=4.29, m=5.19, and (p+q)=0.06; the number average molecular weight (M$_n$) of the (per)fluoropolyether chain is equal to 1200 Dalton, was used.

100 g of the PFPE diol were mixed with 65 g of hexafluorobenzene (from Sigma-Aldrich) and 14 g of KOH powder (title 85%) was added to the liquid mixture at room temperature.

The reaction mass was kept, under stirring, at 60° C. for 6 hours.

The resulting solution was washed two times with aqueous HCl (0.1N) and dried at reduced pressure resulting 122.3 g of colourless liquid product. The $^{19}$F NMR analysis showed a total conversion (>99% by mol) of the CH$_2$CH$_2$OH groups to the correspondent aromatic derivative —CH$_2$CH$_2$OC$_6$F$_5$.

General Compounding and Curing Procedure

FKM-1 was compounded with the ingredients as detailed below in a open mill. Plaques were cured in a pressed mould for 5 minutes at 160° C. and then post-treated in an air circulating oven in conditions (1+4 hours at 230° C.).

The tensile properties have been determined on specimens punched out from the plaques, according to the DIN 53504 S2 Standard.

TS is the tensile strength in MPa;
M$_{100}$ is the modulus in MPa at an elongation of 100%;
EB is the elongation at break in %.

The Shore A hardness (3") (HDS) has been determined on 3 pieces of plaque piled according to the ASTM D 2240 method.

Compression set (C-Set) values have been determined on O-rings (#214 class) according to the ASTM D395-B method (70 hours at 200° C.). Glass transition temperature (T$_g$) of cured specimens was determined according to ASTM D3418.

Curing recipe and conditions and properties of cured sample are summarized, respectively, in tables 1 and 2.

TABLE 1

| Ingredient | | Ex. 1 | Ex. 2 | Ex. 3 | Ex. 4 | Ex. 5C | Ex. 6C |
|---|---|---|---|---|---|---|---|
| FKM-1 | wt parts | 100 | 100 | 100 | 100 | 100 | 100 |
| PFPE-Ar$^F$-1 | phr | | | 10.00 | 20.00 | | |
| PFPE-Ar$^F$-2 | phr | | 20.00 | | | | |
| PFPE-Ar$^F$-3 | phr | 20.00 | | | | | |
| PFPE-1 | phr | | | | | | 20.00 |
| Peroxide$^1$ | phr | 2.00 | 2.00 | 2.00 | 2.00 | 2.00 | 2.00 |
| TAIC$^2$ | phr | 5.00 | 5.00 | 5.00 | 5.00 | 5.00 | 5.00 |
| C-black$^3$ | phr | 30.00 | 30.00 | 30.00 | 30.00 | 30.00 | 30.00 |
| Zinc Oxide$^4$ | phr | 5.00 | 5.00 | 5.00 | 5.00 | 5.00 | 5.00 |

$^1$45% active dispersion of 2,5-dimethyl-2,5-di-t-butyl-peroxy-hexane in calcium carbonate, commercially available from Arkema under tradename Luperox ® 101XL 45;
$^2$Triallyl isocyanurate (75%) dispersion in silica, commercially available as Drimix TAIC 75 from Finco;
$^3$C-black N990 MT from Cancarb;
$^4$ZnO ReagentPlus ® from Sigma Aldrich.

TABLE 2

| Sample | | Ex. 1 | Ex. 2 | Ex. 3 | Ex. 4 | Ex. 5C | Ex. 6C |
|---|---|---|---|---|---|---|---|
| Mixing$^5$ | (a.u.) | good | good | good | good | n.a. | bad |
| TS | (MPa) | 12.2 | 10.5 | 13.0 | 12.5 | 12.0 | 13.4 |
| M$_{100}$ | (MPa) | 2.1 | 2.6 | 3.7 | 2.5 | 5.7 | 2.8 |
| E.B. | (%) | 256 | 142.0 | 195.0 | 226.0 | 160 | 253.0 |
| HDS | Shore A | 55 | 53.0 | 61.0 | 57.0 | 68 | 59.0 |
| C-Set | (%) | 24.0 | 24.8 | 21.3 | 24.3 | 19.6 | 27.0 |
| Tg | (° C.) | −52.0 | −53.0 | −50.0 | −54.0 | −46.0 | −46.0 |

$^5$a.u. = arbitraty unit - Good: No oil traces on the surface of formulated slab nor on the surface of cured items; Bad: traces of oil on the surface of formulated slab and on the surface of cured items; n.a.: not applicable.

Data above recollected well demonstrate that the addition of polymer (E) in above mentioned amounts is effective in providing cured parts having outstanding low temperature behaviour, with a gain of 6 to 8° C. towards lower temperatures in terms of Tg, which is of high significance in this field, while maintaining substantially unchanged mechanical properties and favourable sealing performances.

The addition of a perfluoropolyether deprived of a perfluoroaromatic group is significantly adversely affecting the sealing properties, without providing any significant gain in low temperature behaviour.

The invention claimed is:
1. A (per)fluoroelastomer composition (C) comprising:
   a fluoroelastomer (A), wherein fluoroelastomer (A) is a (per)fluoroelastomer; and
   at least one polymer (E), wherein polymer (E) is a (per)fluoropolyether additive comprising a (per)fluoropolyether chain comprising recurring units having at least one catenary ether bond and at least one fluoro- carbon moiety, and comprising at least one chain end comprising at least one per(halo)fluorinated aromatic group ($Ar^F$) as a terminal group, said polymer (E) being comprised in composition (C) in an amount of 0.5 to 30 phr, with respect to fluoroelastomer (A).

2. The composition (C) of claim 1, wherein fluoroelastomer (A) is selected from:
(1) vinylidene fluoride (VDF)-based copolymers, in which VDF is copolymerized with at least one comonomer selected from the group consisting of:
  (a) $C_2$-$C_8$ perfluoroolefins;
  (b) hydrogen-containing $C_2$-$C_8$ olefins;
  (c) $C_2$-$C_8$ fluoroolefins comprising at least one of iodine, chlorine and bromine;
  (d) (per)fluoroalkylvinylethers (PAVE) of formula $CF_2$=$CFOR_f$, wherein $R_f$ is a $C_1$-$C_6$ (per)fluoroalkyl group;
  (e) (per)fluoro-oxy-alkylvinylethers of formula $CF_2$=CFOX, wherein X is a $C_1$-$C_{12}$ ((per)fluoro)-oxyalkyl comprising one or more catenary oxygen atoms;
  (f) (per)fluorodioxoles having formula:

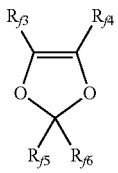

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom;
  (g) (per)fluoro-methoxy-vinylethers (MOVE, hereinafter) having formula:

wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom;
  (h) $C_2$-$C_8$ non-fluorinated olefins (O1);
  (i) ethylenically unsaturated compounds comprising nitrile (—CN) groups, optionally (per)fluorinated; or
(2) TFE-based copolymers, in which TFE is copolymerized with at least one comonomer selected from the group consisting of (c), (d), (e), (g), (h) and (i) as above detailed.

3. The composition (C) of claim 2, wherein-vinylidene fluoride (VDF)-based copolymers, in which VDF is copolymerized with at least one comonomer selected from the group consisting of: tetrafluoroethylene (TFE); hexafluoropropylene (HFP); vinyl fluoride (VF); trifluoroethylene (TrFE); hexafluoroisobutene (HFIB); perfluoroalkyl ethylenes of formula $CH_2$=CH—$R_f$ wherein $R_f$ is a $C_1$-$C_6$ perfluoroalkyl group; chlorotrifluoroethylene (CTFE); (per)fluoroalkylvinylethers (PAVE) of formula $CF_2$=$CFOR_f$, wherein $R_f$ is —$CF_3$, —$C_2F_5$, or —$C_3F_7$; (per)fluoro-oxy-alkylvinylethers of formula $CF_2$=CFOX, wherein X is a perfluoro-2-propoxypropyl group; (per)fluorodioxoles having formula:

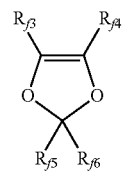

wherein each of $R_{f3}$, $R_{f4}$, $R_{f5}$, $R_{f6}$, equal to or different from each other, is independently selected from the group consisting of —$CF_3$, —$C_2F_5$, —$C_3F_7$, —$OCF_3$, and —$OCF_2CF_2OCF_3$; (per)fluoro-methoxy-vinylethers having formula: $CF_2$=$CFOCF_2OR_{f2}$ wherein $R_{f2}$ is selected from —$CF_2CF_3$, —$CF_2CF_2OCF_3$, or —$CF_3$; ethylene; and propylene.

4. The composition (C) of claim 1, wherein fluoroelastomer (A) comprises recurring units derived from a bis-olefin (OF), wherein bis-olefin (OF) is of the general formula:

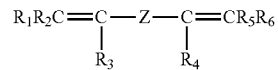

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ hydrocarbon radical, optionally containing oxygen atoms, and optionally fully or partially fluorinated, or a (per)fluoropolyoxyalkylene radical.

5. The composition (C) of claim 4, wherein fluoroelastomer (A) is selected from VDF-based copolymers comprising (with respect to total moles of recurring units of fluoroelastomer (A)):
from 5 to 35% moles of recurring units derived from at least one (per)fluoro-methoxy-vinylethers (MOVE) having formula:

wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom;
from 0.5 to 35% moles of recurring units derived from at least one C2-C8 perfluoroolefin;
with the provisio that the sum of recurring units derived from (per)fluoro-methoxy-vinylethers (MOVE) and from the perfluoroolefin is of at least 10% moles;
from greater than 0 to 5% moles of recurring units derived from bis-olefin (OF); and
from 90 to 30% moles of recurring units derived from VDF.

6. The composition (C) of claim 5, wherein fluoroelastomer (A) is selected from VDF-based copolymers comprising (with respect to total moles of recurring units of fluoroelastomer (A)):
from 15 to 25% moles of recurring units derived from at least one (per)fluoro-methoxy-vinylethers (MOVE) having formula:

from 2 to 25% moles of recurring units derived from at least one $C_2$-$C_8$ perfluoroolefin; with the provisio that the sum of recurring units derived from (per)fluoro-methoxy-vinylethers (MOVE) and from the perfluoroolefin is of at least 17% moles;
from greater than 0 to 2.5% moles of recurring units derived from bis-olefin (OF); and from 83 to 50% moles of recurring units derived from VDF.

7. The composition (C) of claim 1, wherein fluoroelastomer (A) comprises iodine and/or bromine in an amount of 0.001 to 10% wt, with respect to the total weight of fluoroelastomer (A).

8. The composition (C) of claim 1, wherein the (per)fluoropolyoxyalkylene chain of polymer (E) is a chain comprising a plurality of recurring units ($R_1$), said recurring units having general formula: $-(CF_2)_k-CFZ-O-$, wherein k is an integer of from 0 to 3 and Z is selected from a fluorine atom or a $C_1$-$C_6$ perfluoro(oxy)alkyl group.

9. The composition (C) of claim 8, wherein polymer (E) complies with formula:

 (I)

wherein:
$R_f$ is a (per)fluoropolyoxyalkylene chain comprising a plurality of recurring units (R1), said recurring units having general formula: $-(CF_2)_k-CFZ-O-$, wherein k is an integer of from 0 to 3 and Z is selected from a fluorine atom or a $C_1$-$C_6$ perfluoro(oxy)alkyl group;
each of T and T', equal to or different from each other, are selected from:
a group of any of formulae $-CF_3$, $-CF_2C_1$, $-CFZ^*CH_2OH$, $-CFZ^*COOH$, $-CFZ^*COOR_h$, and $-CFZ^*-CH_2(OCH_2CH_2)_k-OH$, wherein k is an integer ranging from 0 to 10, $Z^*$ is F or $CF_3$; and $R_h$ is a hydrocarbon chain; or
a group ($Ar^F$) of formula $-CFZ^{}-CH_2(OCH_2CH_2)_{k'}-O-Ar^F$, wherein k' is an integer ranging from 0 to 10, $Z^{}$ is F or $CF_3$; and $Ar^F$ is a perfluoroaromatic group;
with the proviso that at least one of T and T' is a group ($Ar^F$).

10. The composition of claim 9, wherein polymer (E) complies with formula:

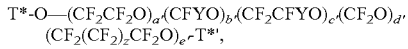

wherein:
Y is a $C_1$-$C_5$ perfluoro(oxy)alkyl group;
z is 1 or 2;
a', b', c', d', e' are integers≥0;
each of T* and T*', equal to or different from each other, are selected from:
a group of any of formulae $-CF_3$, $-CF_2C_1$, $-CFZ^*CH_2OH$, $-CFZ^*COOH$, $-CFZ^*COOR_h$ and $-CFZ^*-CH_2(OCH_2CH_2)_k-OH$, wherein k is an integer comprised ranging from 0 to 10, $Z^*$ is F or $CF_3$; and $R_h$ is a hydrocarbon chain; or
a group ($Ar^F$) of formula $-CFZ^{}-CH_2(OCH_2CH_2)_{k'}-O-Ar^F$, wherein k' is an integer ranging from 0 to 10, $Z^{}$ is F or $CF_3$; and $Ar^F$ is a perfluoroaromatic group;
with the proviso that at least one of T and T' is a group ($Ar^F$).

11. The composition (C) according to claim 1, said composition (C) further comprising at least one peroxide.

12. The composition (C) of claim 11, said composition (C) comprising one or more ingredients selected from the group consisting of:
(a) polyunsaturated curing coagents, in amounts of from 0.5 to 10 phr, relative to 100 weight parts of fluoroelastomer (A);
(b) metallic basic compounds, in amounts of from 0.5 to 15 phr, relative to 100 weight parts of fluoroelastomer (A);
(c) acid acceptors which are not metallic basic compounds, in amounts of from 0.5 to 15 phr, relative to 100 weight parts of fluoroelastomer (A); and
(d) other conventional additives.

13. The composition (C) of claim 12, said composition (C) comprising one or more ingredients selected from the group consisting of:
(a) polyunsaturated curing coagents, in amounts of from 1 to 7 phr, relative to 100 weight parts of fluoroelastomer (A);
(b) metallic basic compounds selected from the group consisting of (j) oxides or hydroxides of divalent metals, and (jj) stearates, benzoates, carbonates, oxalates or phosphites of Ba, Na, K, Pb, or Ca, in amounts of from 1 to 10 phr, relative to 100 weight parts of fluoroelastomer (A);
(c) acid acceptors selected from nitrogen-containing organic compounds, in amounts of from 1 to 10 phr, relative to 100 weight parts of fluoroelastomer (A); and
(d) fillers, thickeners, pigments, antioxidants, stabilizers, or processing aids.

14. The composition (C) according to claim 11, wherein the peroxide is selected from organic peroxides; dialkyl peroxides; di-tert-butyl peroxide; 2,5-dimethyl-2,5-bis(tert-butylperoxy)hexane; dicumyl peroxide; dibenzoyl peroxide; di-tert-butyl perbenzoate; bis [1,3-dimethyl-3-(tert-butylperoxy)butyl] carbonate; or mixtures thereof.

15. The composition (C) according to claim 1, said composition (C) further comprising
at least one curing agent;
at least one accelerator or a combination thereof,
wherein the amount of accelerator(s) is comprised between 0.05 and 5 phr, relative to 100 weight parts of fluoroelastomer (A); and the amount of the curing agent is between 0.5 and 15 phr, relative to 100 weight parts of fluoroelastomer (A).

16. The composition (C) according to claim 15, further comprising at least one ingredient selected from the group consisting of:
i) one or more mineral acid acceptors selected from the group consisting of divalent metal oxides, comprised in amounts of 1 to 40 parts per 100 parts of fluoroelastomer (A);
ii) one or more basic compounds selected from the group consisting of $Ca(OH)_2$, $Sr(OH)_2$, $Ba(OH)_2$, metal salts of weak acids and mixtures thereof in amounts of from 0.5 to 10 parts per 100 parts of fluoroelastomer (A).

17. The composition (C) according to claim 1, wherein fluoroelastomer (A) comprises recurring units derived from ethylenically unsaturated compounds comprising nitrile groups, optionally (per)fluorinated and wherein composition (C) further comprises at least one of (i) organotin compounds; (ii) aromatic amine compounds; (iii) bisamidrazones; or (iv) bisamidoximes.

18. A cured article obtained by moulding and curing composition (C) according to claim 1, wherein the cured article is selected from the group consisting of O(square)-rings, packings, gaskets, diaphragms, shaft seals, valve stem seals, piston rings, crankshaft seals, cam shaft seals, oil seals, piping and tubing.

19. A method for processing the composition (C) according to claim 1, wherein the method comprises at least one of injection moulding, compression moulding, extrusion moulding, coating, screen printing technique, or form-in-place technique the composition (C) of claim 1.

20. The composition (C) according to claim 1, said composition (C) further comprising at least one curing agent selected from the group consisting of aromatic or aliphatic polyhydroxylated compounds, and derivatives thereof;

at least one accelerator selected from the group consisting of 1) quaternary ammonium or phosphonium salts; (2) aminophosphonium salts; (3) phosphoranes; and (4) imine compounds of formula $[Ar_3P-N=PAr_3]^+{}_nX^{n-}$, wherein Ar is an aryl group, n is an integer of 1 or 2 and X is a n-valent anion, or of formula $[(R_3P)_2N]^+X^-$, wherein R is an aryl or an alkyl group, and X is a monovalent anion;

or a combination thereof, wherein the amount of accelerator(s) is comprised between 0.05 and 5 phr, relative to 100 weight parts of fluoroelastomer (A); and the amount of the curing agent is between 1 and 6 phr, relative to 100 weight parts of fluoroelastomer (A).

\* \* \* \* \*

UNITED STATES PATENT AND TRADEMARK OFFICE
CERTIFICATE OF CORRECTION

PATENT NO. : 10,906,999 B2
APPLICATION NO. : 16/061943
DATED : February 2, 2021
INVENTOR(S) : Marco Avataneo et al.

It is certified that error appears in the above-identified patent and that said Letters Patent is hereby corrected as shown below:

In the Claims

•In Claim 9, Column 19, Line 26, the formula "$-CF_2C_1$" should read -- $-CF_2Cl$ --.

•In Claim 10, Column 19, Line 48, the formula "$-CF_2C_1$" should read -- $-CF_2Cl$ --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*